(12) United States Patent
Ladegaard

(10) Patent No.: US 7,088,681 B2
(45) Date of Patent: Aug. 8, 2006

(54) NETWORK SELECTION FOR CONNECTIVITY

(75) Inventor: Lars Ladegaard, Skovlunde (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 931 days.

(21) Appl. No.: 10/056,689

(22) Filed: Jan. 24, 2002

(65) Prior Publication Data

US 2003/0137942 A1   Jul. 24, 2003

(30) Foreign Application Priority Data

Jan. 8, 2002 (EP) ................... 02075041

(51) Int. Cl.
*H04L 12/26* (2006.01)
(52) U.S. Cl. ....................... 370/236; 709/249
(58) Field of Classification Search ............ 370/230, 370/373, 395.2, 395.21, 395.5, 395.52, 400; 709/218, 249
See application file for complete search history.

(56) References Cited

U.S. PATENT DOCUMENTS 5,732,078 A    3/1998  Arango ................. 370/355

| | | | |
|---|---|---|---|
| 2002/0056001 A1* | 5/2002 | Magee et al. | 709/225 |
| 2004/0017798 A1* | 1/2004 | Hurtta et al. | 370/352 |
| 2004/0174882 A1* | 9/2004 | Willis | 370/395.5 |

FOREIGN PATENT DOCUMENTS

| WO | WO 00/02400 | 1/2000 |
|---|---|---|
| WO | WO00 02400 A | 1/2000 |

OTHER PUBLICATIONS

Lai, C., European Search Report for EP 02075041.0 as completed Sep. 27, 2002.

* cited by examiner

*Primary Examiner*—Brenda Pham

(57) ABSTRACT

The invention relates to data communication via a plurality of communication networks, such as IP, ATM, STM, PLMN, etc, networks, and in particular to selection of networks for connectivity. A system is provided in a first network for receiving and holding information from other second networks relating to provided services, quality of services and cost, and for transmission of corresponding information from the first network to the other second networks so that selection of second networks for data transmission may be performed in accordance with criteria defined in the first network, such as desired quality of service, cost, etc.

14 Claims, 2 Drawing Sheets

NETWORK SELECTION FOR CONNECTIVITY

FIELD OF THE INVENTION

The invention relates to data communication via a plurality of communication networks, such as IP, ATM, STM, PLMN, etc, networks, and in particular to selection of networks for connectivity.

BACKGROUND

Until relatively recently, network operators built and configured their networks to carry voice traffic only. Each residential subscriber needed one telephone line at the most, and it was used for speech. By the end of the $20^{th}$ century, fixed and mobile telephony and data communication had evolved largely existing in separate worlds of networks. These worlds shared the same types of transmission facilities and a growing part of the telephony traffic was constituted by dial-up Internet access. Broadband access mostly occurred as high-speed data circuits for large enterprises.

Each of these known networks has its own management systems, its own resources for switching, transport and access, and its own terminal types. Each operator takes responsibility for everything in the supply chain, from subscriber access to service creation and delivery across a fully owned network infrastructure.

However, network operators are challenged by increasing end-user demands. An end-user wants to phone, e-mail, surf, download, stream, and conference at all times of the day and at the same time. Simultaneously, the number of operators are increasing and the competition between operators has increased.

When a user wants to establish a communication channel, e.g. to make a telephone call, conduct a video conference, watch a movie, play a game, chat, search databases, etc, the user typically requests the operator of the network to which he is a subscriber, in the following the first network, to establish and maintain a communication channel between the user and the desired other participants in the requested communication session. The specific operator may however route the data of the communication through other operators' networks, in the following designated second networks. Typically, the operator of the first network selects the second network based on geographical position of the communication participants, the type of service, desired quality of service, and cost.

The competition is most evident in the multiplicity of services and tariffs from each network operator. The tariffs vary not only between destinations but also according to the nature of the contract signed between the subscriber and the operator, the time of day, the duration of the communication, the data rate, the amount of data transferred, the type of data, method of payment, promotions, etc.

Thus, the increasing number of operators, services, complex tariff structures, and different levels of quality of service have created a need for a system for automatic selection of networks for appropriately routing of the data or information of the requested communication session.

The operators compete on business parameters, such as cost, quality, service, interconnect agreements, security, etc. An operator's income is generated by a number of different sources. Income from the connectivity layer is generated by taxation of the media stream, e.g. the transmitted amount of data, the reservation of necessary resources, etc. By careful selection of the second network for connectivity based on business parameters, the operator can increase his profit.

In WO 00/02400 a routing network for use in a telecommunications network is disclosed, comprising a plurality of networks, and in which said routing network has at least one switch for routing traffic to a required destination via another network according to a routing table. The routing network has call routing data management means including: means for monitoring a plurality of parameters associated with the other networks in the telecommunications network; means for determining a routing table for each switch in said network based on the monitored parameters; and, means for controlling the switch or switches according to the determined routing table.

FIG. 1 schematically illustrates a prior art set-up of a communication channel for a communication session. In this example, the communication session is a telephone conversation. The networks 1–5 are IP networks or ATM networks. At the start of the session, session control communication channel 6 is set up, e.g. including negotiation of codec and exchange of connection points. Next, the data payload communication channel 7 or connectivity path 7 is set up as a bearer for transport of the media stream. The boarder elements 8 that reside at the edge of the respective networks establish the bearer 7. The best effort method may be used, or, routing tables for a label switch router may be manually configured.

In a multi-protocol label switching (MPLS) architecture, the boarder elements 8 of FIG. 1 are considered to be ingress/egress nodes. The networks 1–5 contain a number of label switch routers, and a label distribution protocol (LDP) is used to exchange routing information. Constraint based routing within a MPLS network can secure a bandwidth or other service class characteristics of a trunk, but it cannot secure corresponding resources for an individual communication session. Furthermore, MPLS does not provide means for selection of networks in accordance with criteria defined in the first network.

SUMMARY OF THE INVENTION

Thus, there is a need for a system in a first network for receiving and holding information from other second networks relating to provided services, quality of services and cost, and for transmission of corresponding information from the first network to the other second networks so that selection of second networks for data transmission may be performed in accordance with criteria defined in the first network, such as desired quality of service, cost, etc.

As shown in FIG. 1, in a data communication network, session control and data payload, i.e. the media stream, may be separated so that session control and data payload may be carried by different networks. This means that the resources needed in a selected network for establishment of a requested data payload communication channel 7 may not be available at the actual time of communication through that channel, or, the resources may be lost during part of the communication session so that data drop outs or delays are experienced.

It is a further object of the present invention to provide a system that is able to secure that the resources needed for establishment and maintenance of a communication channel with a desired quality of service are available during the entire communication session.

According to a first aspect of the present invention, the above-mentioned and other objects are fulfilled by a network selection system for network selection in a first network of a second network for connection with the first network for data transmission with independent routing of session control and data payload, comprising a network selector having a peer with a storage for holding network parameter values characterizing the second network communicated from the second network to the first network and network parameter values characterizing the first network for communication from the first network to the second network, the network selector being adapted for generation of network selection information based on the parameter values and a selection policy defined in the first network, i.e. the selection policy is defined by the operator of the first network and is accessible by the network selection system.

The network selection system may further comprise a network selection information unit that receives the network selection information and generates dedicated selection information, e.g. based on a comparison of the required service, quality of service, and cost, with available services, quality of services, and costs as held in the peers of the system. The dedicated selection information may then comprise identification of second networks fulfilling the requirements for participating in the requested communication.

The dedicated selection information is forwarded to a boarder element that resides at the edge of the first network and routes data from the first network to other networks. Based on the dedicated selection information, the boarder element selects a second network and transmits the data payload between the first network and the second network.

According to a second aspect of the present invention, a method is provided of network selection in a first network of a second network for connection with the first network for data transmission with independent routing of session control and data payload, comprising the steps of defining a selection policy of the first network, receiving and holding parameters characterizing the second network communicated from the second network to the first network, and generating network selection information based on the parameters and the selection policy.

The method may further comprise the step of generating dedicated selection information based on the network selection information.

The method may further comprise the steps of selecting a second network based on the dedicated selection information, and transmitting a data payload from the first network to the second network.

Parameters characterizing networks include quality of service parameters. Effective network transmission speed, or bandwidth, is obviously one of the most important quality of service parameters. Other important quality of service parameters are cell (ATM networks) or packet loss (IP networks), time delay, sometimes referred to as latency (latency is a measure of time required for a cell or packet to reach a receiving station), jitter (the variation in latency for different cells or packets), priority, security, etc.

At least one of the network parameters may relate to available data transmission capability, e.g. as defined by a quality of service parameter.

Generating of the dedicated selection information, such as routing tables, and distribution of network information are based on policies set by the operator. The entities handling the selection on the edge of the network are referred to as boarder elements, for example in an IP-network, an edge router is a boarder element. Preferably, distribution of the dedicated selection information used by the boarder elements are performed automatically.

Networks having a network selection system according to the present invention, may be of any type, such as IP, ATM, STM, PLMN, etc. They exchange information about reachable networks and their boarder elements. Based on the received network information, the respective systems automatically generate the dedicated network selection information used by the boarder elements, and the network information to be sent to other networks, preferably to peers of the respective networks. Distribution of network information to another network is called advertising. The process of aggregating, generating and propagating the network information is a dynamic process, since cost, quality, etc, of networks change over time.

Thus, the peer may communicate parameters to a corresponding peer in a second network in accordance with an advertising policy defined in the first network.

The network selection information may be updated in response to reception of changed parameters from a peer of a second network.

The network selection information may be updated in response to a change in the selection policy.

Real time multimedia communications over networks, such as the global Internet, have become more cost effective than multimedia communications over the public switching telephone network. However, the quality of the communications, such as voice quality and video quality, depends upon the type of the selected network and upon traffic along the network. In the prior art, the second network is selected in accordance with specific quality of service requirements and the corresponding connectivity is established based upon conditions at the time that the request is processed. However, during the session, the traffic may change significantly and the quality of service may drop below the requested level.

Thus, in a preferred embodiment of the present invention, the network selection system is adapted to establish connectivity with a guaranteed quality of service, i.e. the required quality of service is sustained throughout the duration of the communication session.

Accordingly, in a preferred embodiment of the invention, the boarder element 8 is further adapted to perform a bearer establishment protocol for establishment of a transmission path for the data payload having a desired data transmission capability, such as data rate, latency, jitter, data loss, etc, whereby presence of the specified data transmission capability in the data payload transmission path is guaranteed throughout the duration of the communication session. Thus, The bearer establishment protocol is used between boarder elements 8 of neighboring networks to establish the bearer. The protocol messages cover a set-up, a positive or negative response and a release of a communication session.

BRIEF DESCRIPTION OF THE DRAWINGS

For a better understanding of the present invention reference will now be made, by way of example, to the accompanying drawings, in which.

DETAILED DESCRIPTION OF A PREFERRED EMBODIMENT OF THE PRESENT INVENTION

Figure 1:
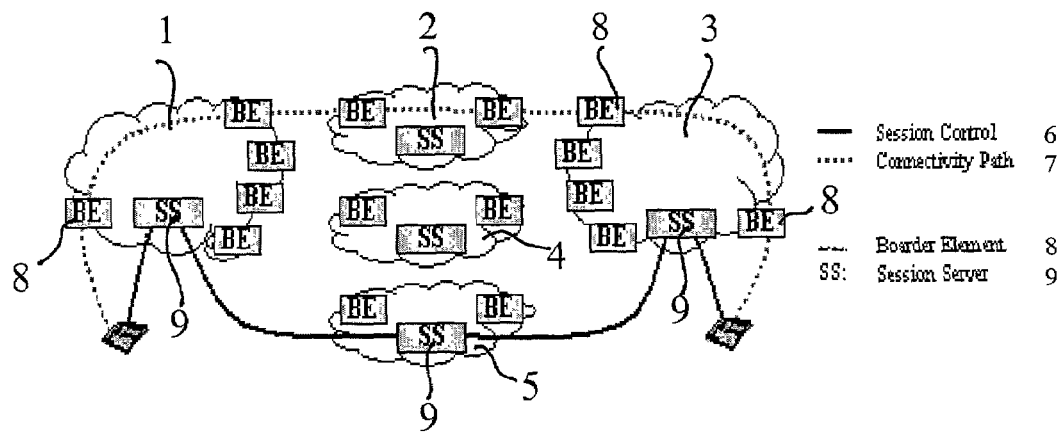
FIG. 1 schematically shows a prior art network selection for establishment of a communication channel, FIG. 2 schematically shows a multimedia network with network selection according to the present invention, FIG. 3 schematically shows connectivity establishment with a bearer establishment protocol according to the present invention, FIG. 4 schematically shows building blocks of the network selection system according to the present invention.
Figure 2:
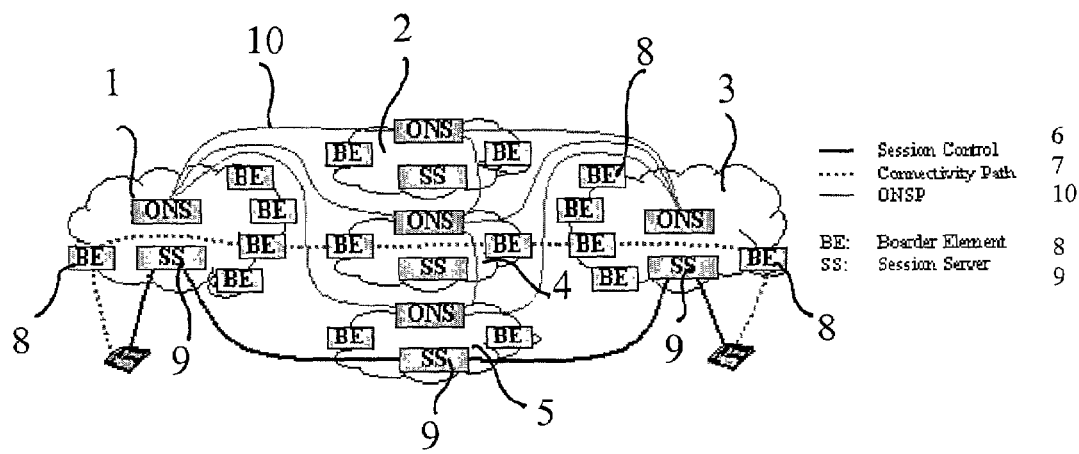

FIG. 2 illustrates schematically selection of networks 1–5, each of which has a network selection system according to the present invention, for establishment of a desired communication channel. The exchange of network information, such as network parameter values, between respective network selectors is performed through network selector communication channels 10. The protocol for exchange of network information is called network selection protocol (ONSP). The network selection communication channels 10 represent business relationships between the operators of the networks. A network selector has an advertisement policy for each communication channel 10 which is a deployment of the business relationship between the two operators of the respective networks.

The network selection system generates the network selection information to be used by the boarder elements 8 for routing the media stream. The generation of the network selection information are based on a routing policy set by the operator of the first network 1. The routing policy is a set of criteria based on which the boarder elements 8 establish connectivity.

The boarder elements 8 use a subset of the network selection protocol for advertising of their capabilities. The subset of the ONSP used by the boarder elements 8 is referred to as network selection protocol for boarder elements 8 (ONSP-BE). Boarder element capabilities comprise information on which operators the specific boarder element 8 is connected to and quality of service level. The ONSP-BE connection is not shown in FIG. 2. The boarder elements 8 advertise their capabilities to the network selector of the network in which they reside.

Preferably, the boarder elements 8 and network routers are able to guarantee the desired resources for a communication session. This is achieved by the new protocol bearer establishment protocol that may be implemented as an extension to the known label distribution protocol (LDP).

The bearer establishment protocol holds information about required network resources to guarantee the perfection of the single media stream. The individual LSR (Label Switching Router) must use the required network resources for the single media stream to select a suitable trunk and reserve the resources. The bearer establishment protocol has to be used between the end points to set-up the bearer, like the session initiating protocol (SIP) does for the control. The following is an example on the use of the bearer establishment protocol.

Figure 3:
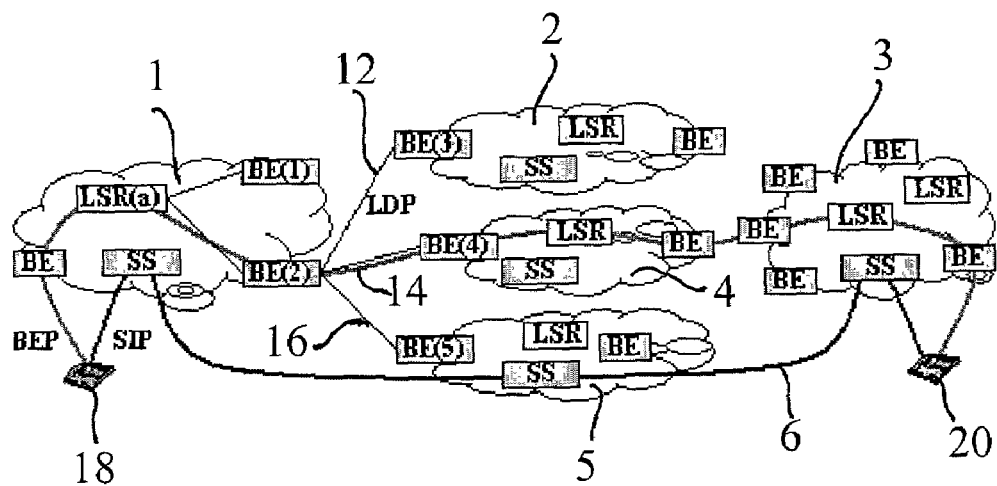

When using Constraint-based routing in MPLS networks or using IPSEC it is possible to change the size of the trunk. A decrease of the trunk's capacity to a level that is less than currently in used SHALL be denied since it will jeopardize the guaranteed quality of the established connections. In FIG. 3, the trunk 16 is loaded with 9,5 Mbit/s and the capacity of the trunk must NOT be decreased under that level. The load of 9,5 Mbit/s is a current value, and later it may be lower, e.g. 4 Mbit/s, at which point in time the capacity of the trunk may be decreased to 4 Mbit/s.

In FIG. 3, the boarder elements 8 are ingress and egress label switching routers. The trunks between the boarder elements 8 have been established using label distribution protocols with constraint based set-up of label switching routers, and, in this example, the guaranteed bandwidth of the trunks is 10 Mbit/s. The load of the trunk 16 between BE(2) and BE(5) is 9,5 Mbit/s when the calling party 18 makes a video call requiring 1 Mbit/s bandwidth.

The call starts by initiating a control path 6 between the two participants 18, 20 in the video call using SIP. The invite message from the calling party 18 will in the LDP hold information for codex negotiation. The called party 20 answers with OK200 and in the LDP part includes necessary information to complete the codex negotiation. In FIG. 3, the session control is routed via network 5. Neither SIP nor LDP contain any information about routing of the data payload.

Then, the bearer connection for the data payload, i.e. the media stream, is set-up using the bearer establishment protocol. The calling terminal 18 transmits the desired quality of service to the first network 1 for completing the call. Desired quality of service may be specified as a desired minimum level of quality of service and a maximum cost per transmitted megabit. The bearer establishment protocol establishes the connectivity path link-by-link, since the required resources must be guaranteed at every label switching router (LSR). For example, at the egress LSR BE(2), the trunk 16 from BE(2) to BE(5) can not be selected, since the amount of free bandwidth is insufficient for fulfilling the requirement set for the connectivity path. BE(2) selects the trunk 14 to BE(4) for carrying the media stream. The operation of the bearer establishment protocol in relation to establishment of connectivity corresponds to the operation of the session initiating protocol in relation to establishment of the session control path.

The boarder elements 8 may further output charging data for taxation purposes to a AAA server (Authentication, Authorization, and Accounting (AAA)) using the known Radius Protocol. For identification of the call, the bearer establishment protocol must carry a global unique identity included in the charging output from the boarder element 8. The global unique identity is also carried by the Session Control Protocol (SCP) so that the AAA server may combine all the records into one charging record. The AAA server and the connection from the boarder element 8 are not shown in FIG. 3. The boarder elements 8 will use the AAA server of the network wherein the boarder elements 8 reside.

It should be noted that aggregating, generating and propagating network information is performed automatically based on the policies set by the operator.

Figure 4:
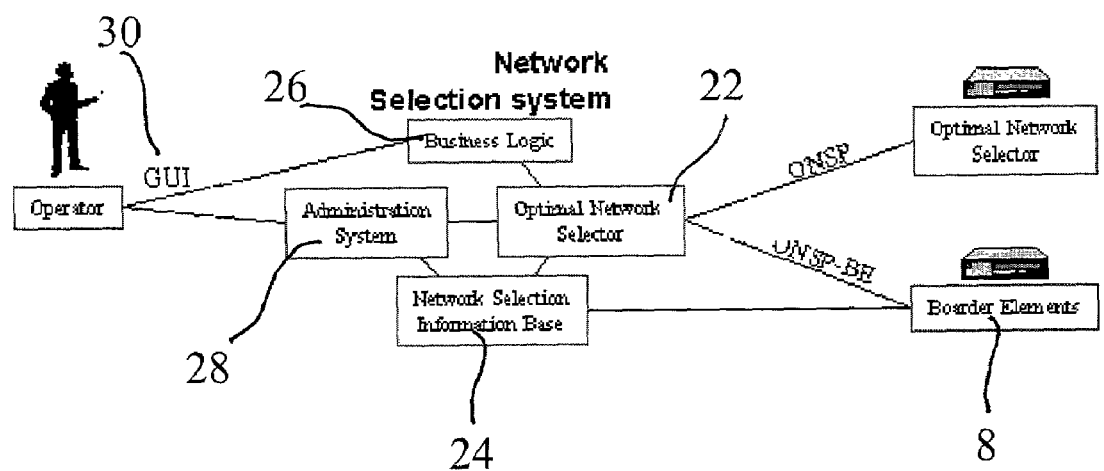

FIG. 4 schematically shows building blocks of the network selection system according to the present invention. The network selection system comprises four subsystems: the network selector 22, the network selection information unit 24, the business logic 26 and the administration system 28.

The operator can set the policies manually or use the business logic 26 to generate policies.

The network selection information unit 24 generates the dedicated network selection information. The network selection information unit 24 has access to the characteristics of the different boarder elements 8 and generates the dedicated network selection information for the single boarder element 8 based on the respective characteristics. The network selection information is received from the network selector 22.

The characteristics of the different boarder elements 8 are received from the administration system 28.

The protocol for downloading the routing tables to the boarder element 8 may be based on LDAP or XML.

The network selector 24 exchanges network information according to the advertisement policy and generates network selection information according to the selection policies. The exchange of network information is done over the network selection protocol ONSP as already described. Generation of the network selection information and advertisements is based on the operator policy. The policies are received from either the business logic 26 or the administration system 28. The generated network selection information is sent to the network selection information unit 24.

The network selector 22 has data for holding the connections to other network selection systems. There are security mechanisms to ensure that only authorized network selection systems are connected.

The network selector 22 is connected to boarder elements 8 performing network selection. The boarder elements 8 advertise their capabilities to the network selector 22. The capability of the boarder elements 8 may be set up manually using the administration system 28.

The configuration of the network selection system is done through the administration system 28.

The business logic 26 is used for generating advertisement policies and network selection policies. The business logic 26 has its own user interface 30. With the user interface the operator can set the conditions for generation of advertisement policies and network selection policies. The generated advertisement policies and network selection policies are send to the respective network selectors 22.

The administration system 28 is the operator interface to the network selection system. The administration system 28 is used for configuration of the network selector 22 and the network selection information unit 24. The configuration of the network selection system listed below is valid when both boarder elements 8 and neighboring networks supports network selection.

The operator must define a peer for connecting the neighboring networks network selection system.

The operator must define the parameters related to the automated generation of policies.

The operator must define the characteristic of the boarder elements 8 routing capabilities.

When the neighboring networks do not support network selection, the operator must define the domains that can be reached through the neighboring network in question.

For boarder elements 8 not supporting ONSP-BE, the operator must define the supported domains and/or routing numbers.

In absence of the business logic 26, the operator of the first network must also define the policies for generating the network selection information and the policies for advertising network information to other operators.

The boarder element 8 handles bearer establishment. Based on the network selection information received from the network selection information unit 24, the boarder element 8 will look up a suitable remote boarder element 8 for handling the bearer. The selection of the remote boarder element 8 is the previously mentioned business parameters.

When the boarder element 8 has selected a remote boarder element 8, a set-up request is send using the bearer establishment protocol (BEP) to the remote boarder element 8. The remote boarder element 8 accepts or rejects the request depending on whether or not it can fulfill the requirements. Upon a rejection, the boarder element 8 selects another remote boarder element.

The network selection protocol ONSP is used to exchange network information between network selection systems. The network selection protocol is a push protocol, i.e. information is send without an information request.

When operators is using the network selection system, the operators only have to define the neighboring network for the boarder element 8 connecting to the neighboring network and set up a peer towards the neighboring operators network selection system. All the networks, which can be reached through this neighboring network, will be received as advertisements over the peer.

When there are connections/business agreements between neighboring networks, the operator must define the connection points in his own network. No connections should be set between networks without physical interconnections.

It is an important advantage of the present invention that in a network environment with many networks having a network selection system of the present invention, the operators receive connectivity information from their neighboring networks and therefore do not have to configure the boarder elements 8 manually.

The first operator to use the network selection system gets automated configuration of the routing tables in the boarder elements 8. Presently, routing tables are defined manually by the operator. The network selection system must be configured with knowledge about networks that can be reached through a given boarder element 8. With the network information, the network selection information unit 24 can generate the dedicated network selection information for the boarder elements 8.

With only one operator using the network selection system, the operator must define all reachable networks manually for all the boarder elements 8. The first operator has to manage a large network in order to benefit from the system.

If the first operator has several networks around the world, the operator will most likely also have a number of domains. If the operator can get the network selection systems of the different domains connected, the operator has automated updating of routes and connection points around the world. Whether the networks connecting is domains are IP or PSTN is only a limitation on the transport. PSTN would most likely only support 64 Kbit/s or speech.

The invention claimed is:

1. A network selection system for network selection in a first network of a second network for connection with the first network for data transmission with independent routing of session control and data payload, comprising
   a network selector having a peer having a storage for holding parameters characterizing the second network communicated from the second network to the first network, the network selector being adapted for generation of network selection information based on the parameters and a selection policy defined in the first network;
   a network selection information unit that receives the network selection information and generates dedicated selection information; a boarder element for transmission of a data payload from the first network to the second network that is selected by the boarder element based on the dedicated selection information; wherein the boarder element is adapted to perform a bearer establishment protocol for establishment of a transmission path for the data payload having a desired data transmission capability whereby presence of the specified data transmission capability in the payload transmission is ensured.

2. A network selection system according to claim 1, wherein the peer has a further storage for holding parameters characterizing the first network for communicating from the first network to the second network.

3. A system according to claim 1, wherein at least one of the parameters relates to available data transmission capability.

4. A system according to claim 1, wherein a peer communicates parameters to a corresponding peer in the second network in accordance with an advertising policy defined in the first network.

5. A system according to claim 1, wherein the network selection information is updated in response to reception of changed parameters from a peer of a second network.

6. A system according to claim 1, wherein the network selection information is updated in response to a change in the selection policy.

7. A method of network selection in a first network of a second network for connection with the first network for data transmission with independent routing of session control and data payload, comprising the steps of defining a selection policy of the first network, receiving and holding parameters characterizing the second network communicated from the second network to the first network, and generating network selection information based on the parameters and the selection policy;

performing a bearer establishment protocol for establishment of a transmission path for the data payload having a desired data transmission capability whereby presence of the specified data transmission capability in the payload transmission path is ensured.

8. A method according to claim 7, further comprising the step of generating dedicated selection information based on the network selection information.

9. A method according to claim 8, further comprising the steps of selecting a second network based on the dedicated selection information, and transmitting a data payload from the first network to the second network.

10. A method according to claim 7, further comprising the step of holding parameters characterizing the first network for communication from the first network to the second network.

11. A method according to claim 7, wherein at least one of the parameters relates to available data transmission capability.

12. A method according to claim 7, wherein parameters are transmitted from the first network to the second network in accordance with an advertising policy defined in the first network.

13. A method according to claim 7, wherein the network selection information is updated in response to reception of changed parameters from a second network.

14. A method according to claim 7, wherein the network selection information is updated in response to a change in the selection policy.

* * * * *